F. P. FENTRESS.
COMBINATION REAR SEAT AND CARRIER FOR MOTOR CYCLES.
APPLICATION FILED MAR. 24, 1910.
965,093.
Patented July 19, 1910.
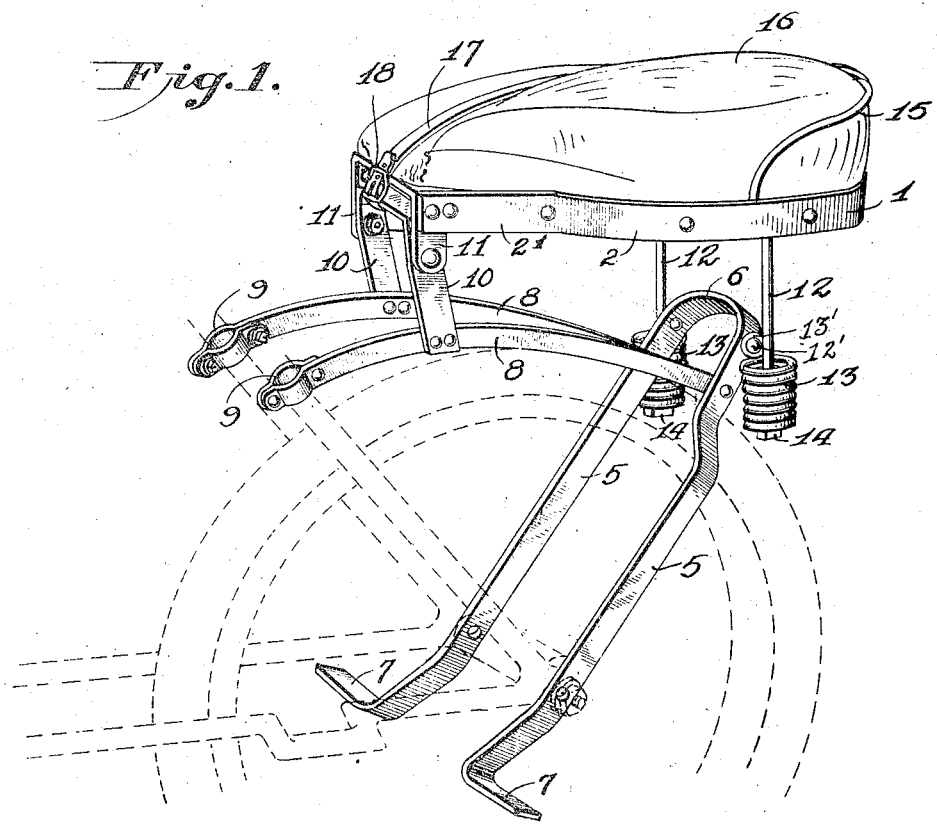
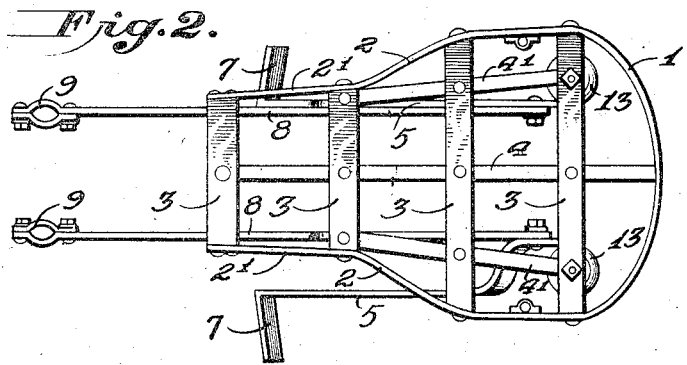
Frank P. Fentress,

UNITED STATES PATENT OFFICE.

FRANK P. FENTRESS, OF TACOMA, WASHINGTON.

COMBINATION REAR SEAT AND CARRIER FOR MOTOR-CYCLES.

965,093.  Specification of Letters Patent.  Patented July 19, 1910.

Application filed March 24, 1910. Serial No. 551,240.

*To all whom it may concern:*

Be it known that I, FRANK P. FENTRESS, a citizen of the United States of America, residing at Tacoma, in the county of Pierce and State of Washington, have invented certain new and useful Improvements in Combination Rear Seats and Carriers for Motor-Cycles, of which the following is a specification, reference being had therein to the accompanying drawing.

This invention has for its object to provide a combined rumble seat and parcel carrier adapted to be secured to a motor-cycle or bicycle.

The invention further has for its object to provide a combined rumble seat and parcel carrier so constructed and arranged that it may be readily secured to and detached from the frame of a motor-cycle or bicycle, and will be securely held in place and adapted to the purpose for which it is used.

These and other objects of this invention will appear in the course of the following specification.

Referring to the accompanying drawing, Figure 1 is a view in perspective of the device constructed in accordance with this invention. Fig. 2 is a plan view thereof.

In carrying out the invention, a seat is provided consisting of a strip of metal 1, bent and curved to form the sides and rear portion of the seat frame, and having its forward portions inclined inward as at 2, and then extending forward with the straight portions 2′. The strip 1 is braced by means of transverse strips 3, secured thereto, a central longitudinal strip 4, secured to the strips 3, and the strip 1, and diagonal strips 4′ secured to several of the strips 3.

In order to mount the seat frame on a motor-cycle or bicycle, a suitable frame is provided, which, as here shown, preferably consists of an underlying supporting member consisting of a metallic strip bent to form the arms 5 which converge at their upper ends to form a U-shaped portion 6 to straddle the rear wheel of a motor-cycle, as shown in dotted lines in Fig. 1, the lower ends of the arms 5 converging and formed with the lateral projections 7 serving as steps. The arms 5 may be detachably secured adjacent to their converging ends by means of nuts to the lower corner of the motor-cycle frame, as shown in Fig. 1. To the upper U-shaped portion 6 of the underlying supporting member is secured one end of the curved metallic strips 8, the other ends of said strips being provided with clamping means 9 for securing them to the inclined brace bars of the motor-cycle frame, shown in dotted lines in Fig. 1. The seat frame is supported at its forward end by the inverted U-shaped strip 10 riveted to the strips 8 and at its upper portion to the depending strips 11 at each end of the front cross strip 3. The seat frame is supported adjacent to its rear end by means of rods 12 depending from the seat frame and projecting into coil springs 13, mounted on the U-shaped portion 6 of the underlying supporting member by means of the looped end 13′ of each spring secured to a pin 12′, the lower end of each of the rods 12 having a head or enlargement 14 engaging the lower end of the spring 13. The rear portion of the seat frame is provided with a back 15, which aids in retaining on the seat frame a cushion 16 resting thereon and held in place by a strap 17, extending over the cushion and the bottom of the seat frame and having its ends secured by a buckle 18.

It will be seen that by means of this construction hereinbefore described, a rumble seat and parcel carrier is provided which can readily be detachably mounted on the frame of a motor-cycle over its rear wheel and will afford, through the springs and braces, a comfortable seat. When it is desired to use the device as a parcel carrier, the cushion 16 may be removed and parcels and other matter may be secured to the seat frame and carried thereon.

What I claim as my invention is:—

1. In a device of the character described, a seat frame, curved supporting members beneath said frame having means at one end for detachably fastening them to the frame of a motor-cycle, a frame secured at its upper end to the other ends of the curved supporting members and adapted to be detachably secured to the frame of a motor-cycle, uprights connecting the forward end of the seat frame to said curved supporting members, and cushioning supporting members connecting the rear portion of the seat frame with the upper end of the frame connected with said curved supporting members.

2. In a device of the character described, a seat frame, a pair of longitudinal arms beneath said frame having means at one end for securing them to the brace bars of a motor-cycle, a downwardly-extending U-shaped brace member with its upper portion secured to one end of the said longitudinal arms and having its arms adapted to be secured to the rear axle of a motor-cycle, and projecting ends with lateral projections forming steps, vertical connections between the forward end of the seat frame and the underlying longitudinal arms, and springs supported between the rear end of the seat frame and the U-shaped brace member.

3. In a device of the character described, a seat frame, a longitudinally-extending supporting member extending beneath and forward from said seat frame with means at the forward end of said supporting member for securing it to the diagonal rods of a motor-cycle frame, a downwardly diagonally-extending supporting member adapted to straddle the rear wheel of a motor-cycle and secured at its upper end to the horizontal supporting member and having means for securing it to the rear axle frame of the motor-cycle, supports connecting the front of the seat frame with said horizontal supporting member, and vertical supports depending from said seat frame and having a resilient connection with the inclined supporting member.

In testimony whereof I hereunto affix my signature in presence of two witnesses.

FRANK P. FENTRESS.

Witnesses:
O. N. JOHNS,
HARRY E. PHELPS.